(12) United States Patent
Howard

(10) Patent No.: US 7,207,580 B2
(45) Date of Patent: Apr. 24, 2007

(54) PRECISION STEER WHEEL CONTROL SYSTEM WITH REMOTE TRIM VALVE ASSEMBLY

(76) Inventor: Durrell U. Howard, 306 Krameria Dr., San Antonio, TX (US) 78213

( * ) Notice: Subject to any disclaimer, the term of this patent is extended or adjusted under 35 U.S.C. 154(b) by 267 days.

(21) Appl. No.: 11/036,853

(22) Filed: Jan. 14, 2005

(65) Prior Publication Data

US 2005/0167939 A1   Aug. 4, 2005

Related U.S. Application Data

(63) Continuation-in-part of application No. 10/953,965, filed on Sep. 29, 2004, which is a continuation-in-part of application No. 10/211,091, filed on Aug. 2, 2002, now Pat. No. 6,817,620.

(51) Int. Cl.
*B62D 7/22* (2006.01)

(52) U.S. Cl. .................................. 280/89.11

(58) Field of Classification Search ............ 280/89.11, 280/89.12, 89.13, 90, 268; 180/417, 421, 180/422, 441; 74/388 PS, 495, 496, 89.25
See application file for complete search history.

(56) References Cited

U.S. PATENT DOCUMENTS

| | | | |
|---|---|---|---|
| 2,509,570 A | 5/1950 | Lee |
| 2,760,518 A | 8/1956 | Peet |
| 3,075,576 A | 1/1963 | Herbert |
| 3,169,551 A | 2/1965 | Lewis |
| 3,230,975 A | 1/1966 | Mercier |
| 3,318,251 A | 5/1967 | Smith |
| 3,730,307 A | 5/1973 | Mitchell |
| 3,756,367 A | 9/1973 | Mitchell et al. |
| 3,792,721 A | 2/1974 | Zahid |
| 3,857,413 A | 12/1974 | Zahid |
| 3,863,947 A | 2/1975 | Weston |
| 3,870,335 A | 3/1975 | Schultz |
| 3,882,953 A | 5/1975 | Maisch |
| 3,882,954 A | 5/1975 | Inoue |
| 3,887,027 A | 6/1975 | Allison |
| 3,897,846 A | 8/1975 | Inoue |
| 3,958,656 A | 5/1976 | Niemann |
| 3,960,179 A | 6/1976 | Zahid |
| 3,961,646 A | 6/1976 | Schon |
| 4,008,782 A | 2/1977 | Chanal |
| 4,088,154 A | 5/1978 | Patton et al. |

(Continued)

*Primary Examiner*—Faye M. Fleming
(74) *Attorney, Agent, or Firm*—Townsend M. Belser, Jr.; Nexsen Pruet Adams Kleemeier, LLC

(57) ABSTRACT

A steer wheel control system having a centering unit for holding center by resisting off-center movement of the steered wheels of a vehicle and returning them to a selected center position after each such movement, and a trim unit for remotely varying the selected center position. The resistance and return forces may also be varied. A plurality of passages and check valves in a remote trim valve assembly make the trim unit operable by a single solenoid valve mounted on a remote manifold that is in fluid communication with passages in an intermediate head between the trim unit and the centering unit. A 3-way valve between a fluid accumulator and the centering unit provides depressurization of the centering unit in the absence of electrical power or upon a loss of power steering.

29 Claims, 5 Drawing Sheets

U.S. PATENT DOCUMENTS

| | | |
|---|---|---|
| 4,349,079 A | 9/1982 | Leiber |
| 4,359,123 A | 11/1982 | Haupt et al. |
| 4,410,193 A | 10/1983 | Howard |
| 4,418,931 A | 12/1983 | Howard |
| 4,467,884 A | 8/1984 | Robertson et al. |
| 4,503,678 A | 3/1985 | Wimbush |
| 4,506,507 A | 3/1985 | Wimbush |
| 4,534,577 A | 8/1985 | Howard |
| 4,558,878 A | 12/1985 | Motrenec |
| 4,566,712 A | 1/1986 | Motrenec |
| 4,585,400 A | 4/1986 | Miller |
| 4,588,198 A | 5/1986 | Kanazawa et al. |
| 4,634,135 A | 1/1987 | Nakata et al. |
| 4,638,838 A | 1/1987 | Richard et al. |
| 4,669,567 A * | 6/1987 | Nakamura et al. .......... 180/415 |
| 4,722,545 A | 2/1988 | Gretz et al. |
| 4,828,063 A | 5/1989 | Ogura |
| 4,872,486 A | 10/1989 | Sugimura et al. |
| 4,903,973 A | 2/1990 | Bray |
| 5,076,383 A | 12/1991 | Inoue et al. |
| 5,313,389 A | 5/1994 | Yasui |
| 5,536,028 A | 7/1996 | Howard |
| 6,267,395 B1 | 7/2001 | Howard |
| 6,422,582 B1 | 7/2002 | Howard |
| 6,520,519 B2 * | 2/2003 | Howard ................... 280/89.13 |
| 6,520,520 B2 * | 2/2003 | Howard ....................... 280/90 |
| 6,817,620 B1 | 11/2004 | Howard |

* cited by examiner

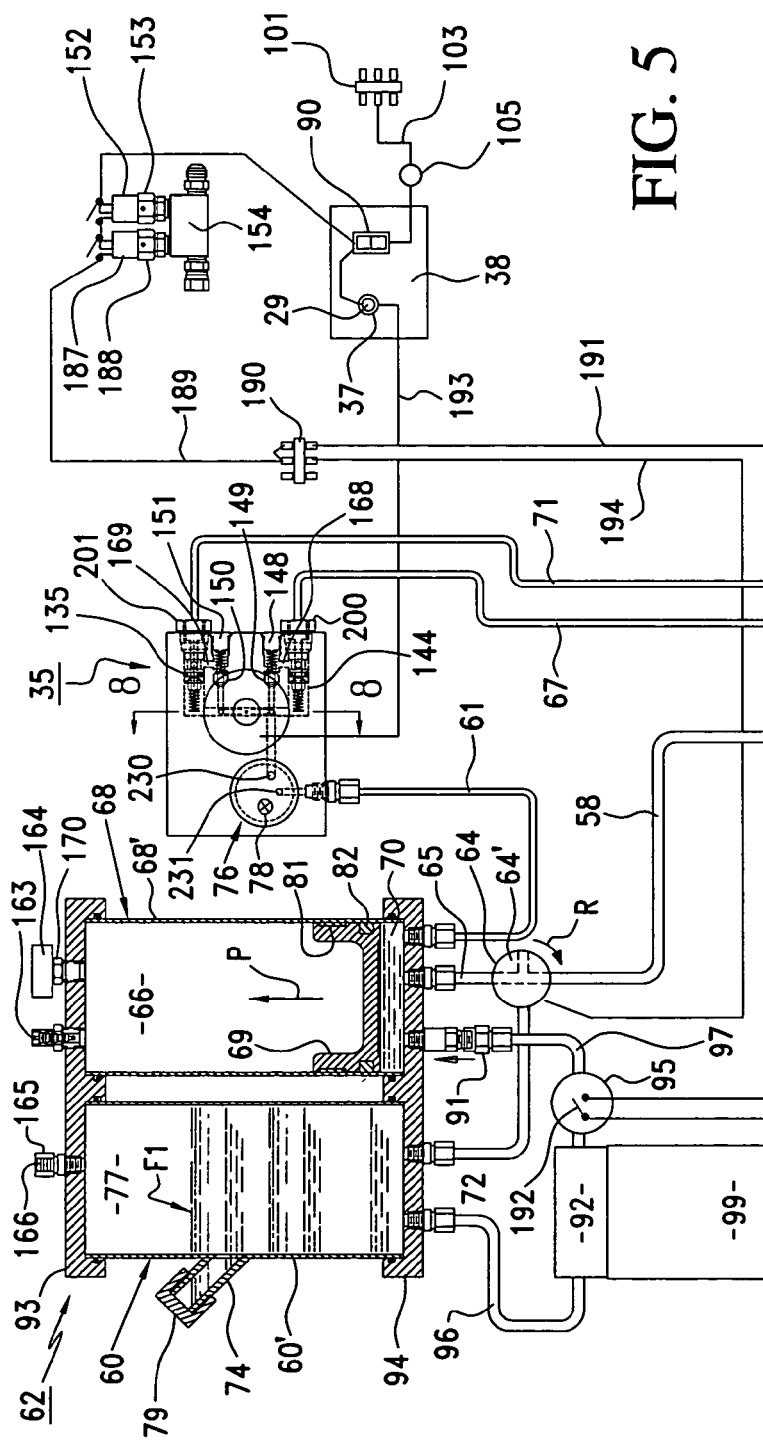
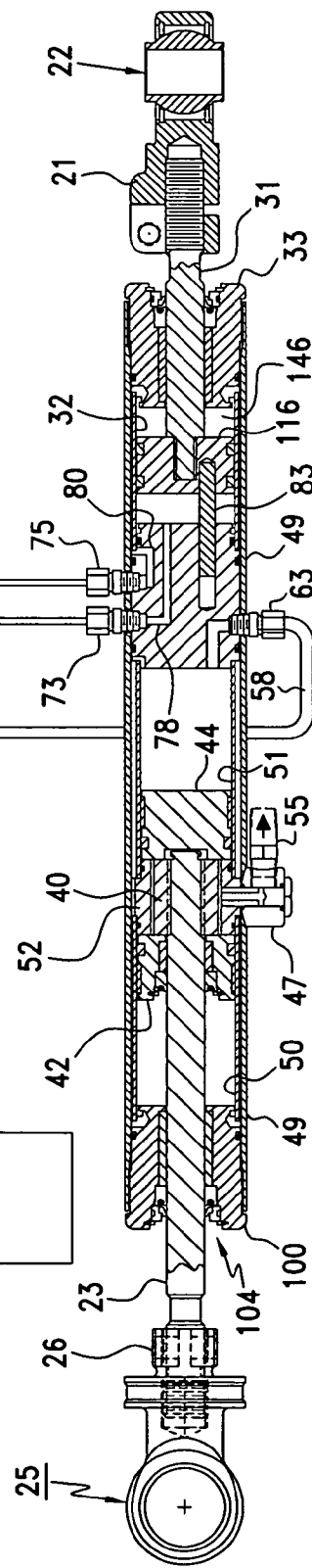
FIG. 5

PRECISION STEER WHEEL CONTROL SYSTEM WITH REMOTE TRIM VALVE ASSEMBLY

RELATED APPLICATIONS

This application is a continuation-in-part of pending U.S. patent application Ser. No. 10/953,965 filed Sep. 29, 2004, which was a continuation-in-part of U.S. patent application Ser. No. 10/211,091 filed Aug. 2, 2002, now U.S. Pat. No. 6,817,620, the entire contents of this patent and these prior related applications being expressly incorporated herein by reference.

FIELD OF THE INVENTION

This invention relates to vehicle steering systems and more particularly to a device for holding the steer wheels of a motor vehicle, such as a motor home, bus, truck, automobile or the like, so that a center steering position is maintained in spite of spurious steering inputs, such as those caused by variable crosswinds, crown curvature or slant of the highway, or other factors tending to adversely affect vehicle steering by the driver.

BACKGROUND OF THE INVENTION

The steering systems of highway motor vehicles and the like are designed primarily for driver control. In these systems, the steering force required on the steering wheel and the ratio between steering wheel movement and movement of the steerable ground wheels (also referred to herein as "steer wheels") depend upon the characteristics of the particular vehicle and the conditions under which it will usually be operated. A wide variety of extraneous forces can act on a vehicle steering system and spurious steering inputs caused by these forces must be dealt with satisfactorily in order to provide stable and controllable steering of a vehicle. As vehicle speed increases, the effects of any spurious steering inputs are magnified, making it necessary for the driver to exercise more precise and careful driving control.

In the past, motor vehicle steering systems have provided some steering wheel returnability by slanting the king pins of the steer wheels so that their top ends are aft of their bottom ends. This is referred to as a positive king pin angle and produces a turning-lift effect that provides some steering wheel returnability as explained further below. The use of positive king pin angles involves compromises over the full steering spectrum because it results in positive caster offset and thereby produces castering of the steer wheels. For example, the adverse effects of strong gusty cross winds are more pronounced with large amounts of positive caster offset. As its name would imply, the vehicle tends to caster towards the side of the roadway to which it is being pushed by the wind. Thus, the adverse steering inputs caused by crosswinds are directly related to the amount of positive king pin angle, which is a classic example of having to balance a benefit with a detriment.

Any small amount of stability gained on a non-windy day from slanting the steer wheel king pins may be paid for many times over when driving in a crosswind because of the destabilizing castering effect of the crosswind. Similarly, a high crown at the center of the roadway or a slanted roadway tends to cause vehicles with castered steer wheels to turn toward the edge of the roadway, that is, in the downhill direction. Castered steer wheels also allow steering inputs from rutted and other imperfect roadway surfaces to steer back against the driver and thereby cause road wander, which is a universal driving complaint, particularly by driver's of heavy vehicles such as trucks and motor homes. In addition, due to increased turning-lift effects, generous positive king pin angles provide significant resistance to small radius turns, which can make city driving quite fatiguing. These adverse effects are some of the negative aspects of attempting to achieve steering system stability through generous amounts of positive king pin angle.

Another drawback of prior art steering systems is that spurious inputs transmitted from the roadway through the steer wheels affect substantially the entire steering assembly before encountering any stabilizing resistance from the steering wheel. The transmission of these inputs between the steer wheels and the steering wheel causes the interconnecting components of the steering system to repeatedly oscillate between states of tension and compression. Such oscillations cause wear and slack in ball joints and other connections and have long been considered a primary source of stress fatigue which can lead to premature failure of various steering system components. Mechanical slack due to worn parts can also be a cause of steering system oscillations and vehicle wandering that require constant corrections and therefore produce driver fatigue.

For lack of a more advanced method, slanting of the steer wheel king pin has been accepted by the industry in the past as a low-cost method of achieving steer wheel returnability. Accordingly, many over-the-road vehicles are provided with generous amounts of positive caster offset. Not much thought has been given by others to the self-defeating side effects of steer wheel castering. Keeping a vehicle tracking straight and under control currently requires an inordinate amount of driver steering corrections to counteract the adverse side effects of castered steer wheels. The repetitive task of making numerous precise steering corrections mile after mile weighs heavily on a driver's physical and mental well-being, and may result in extreme driving fatigue. Thus, a highly important consideration that has long been overlooked by the industry is that steer wheel castering is directly responsible for road wander, crowned road steering wheel pull and cross wind steering problems. The failure of the industry to recognize the critical need to provide directional stability by replacing slanting of the king pins with another method of achieving steer wheel returnability may go down in history as one of the longest enduring vehicle design oversights.

My Precision Steer Wheel Control Technology (PSWCT) has brought to light incorrect technical assumptions that have been responsible for this long-standing major vehicle design oversight, which has in effect been responsible for a lack of heavy vehicle directional stability and related highway safety issues. The heavy vehicle industry has made amazing progress in advancing the state of the art in heavy vehicle design with the exception of recognizing the critical need for directional stability. For over a half a century, the driving of heavy vehicles that are lacking in directional stability has required an inordinate amount of corrective driver steering to keep the vehicle going straight and under control. To be directionally stable, a vehicle's steering system must be designed so that the steer wheels track exceptionally straight without requiring repetitive driver steering corrections to keep the vehicle under directional control, thereby greatly reducing the driver work-load. It has been shown that the industry-wide method of slanting the king pins of the steer wheels to achieve steering wheel returnability is the major cause of the unstable behavior of the steer wheels, which results in driver fatigue and a surprising number of other drivability and operational problems.

While this low-cost simple method of achieving steering wheel returnability is desirable from a manufacturing point of view, the resultant operational problems are very undesirable to the consumers, especially to the heavy vehicle drivers who must endure the million upon millions of miles that are many times more fatiguing to drive than they would be in a directionally stable vehicle that is not adversely affected by crosswinds. Historians will find it hard to rationalize how the hundred-year-old method of achieving steering wheel returnability by the "turning-lift effect" could have been used for so long, without steer wheel castering problems being recognized for their negative effect on heavy vehicle drivability. It was not for the lack of consumer complaints about the repetitive steering corrections required to maintain directional control in spite of road wander and steering wheel pull, about crosswind driving fatigue, and about the cost of accelerated steer wheel tire wear.

In fairness to the presently very capable heavy vehicle design community, the industry-wide endorsement of the long standing heavy vehicle steering and control methodology was established before their time, and had been universally accepted throughout the heavy vehicle industry as a cost-effective method of dealing with heavy vehicle steering requirements. Because the consumers' only choice has been to accept the lack of heavy vehicle directional stability and the related drivability problems as normal, other more pressing problems that the consumers were aware of were given priority over advancing the state of the art in heavy vehicle drivability.

Castering and the turning-lift effect may be further explained as follows with reference to prior art FIGS. 1 to 3. In the beginning when the horseless carriage first took to the road, uncomplicated simple technology was of great importance. As a product improvement, the steering tiller initially was traded for a steering wheel that presented a problem because the steering wheel would stay turned after turning a corner. The lack of steering wheel returnability was solved by the simple method of slanting the pivot axis A1 of a steer wheel king pin 2 aft at the top end to accomplish a turning-lift effect created when the steer wheel 3 was turned to the aft side of the slanted king pin, which moved the turning steer wheel downward by a small amount relative to the vehicle frame as illustrated by broken line 3' in FIG. 1. This downward wheel movement in turn lifted the vehicle frame (not shown) by the same small amount, which is represented by the lift height L1 between the arrows marked "Lift". When the vehicle driver releases the steering wheel after turning, the weight of the vehicle then causes the steer wheel that turned to the aft lower side of the slanted king pin and thereby lifted the vehicle, to return toward the lower most on-center driving position represented by the solid line steer wheel 3.

To better understand the turning-lift effect, a graphic example that almost everyone is familiar with is the post of a farm gate that becomes slanted with the passage of time due to the weight of the gate in its closed position. When the gate 10 is opened in either direction, the low end of the gate is lifted by turning it toward a non-slanting side of the post 9 on a pair of hinges 8,8, creating a turning lift effect as illustrated in prior art FIG. 2 by the broken line 11, which shows a turned position of gate 10, and the lift height L2 between the arrows marked "Lift". When the gate is released, its weight will cause it to swing back toward the lower closed position represented by the solid line gate 10 in FIG. 2. On either side near the gate's closed position, the turning-lift effect diminishes and becomes almost neutral such that its weight alone is not able to hold the gate in the fully closed position, requiring a suitable latch mechanism to keep it fully closed. In a similar manner to the turning lift of the farm gate, when the steer wheels of a vehicle return toward their lowermost on-center, straight ahead position, the turning-lift effect also diminishes and does not have enough centering force to keep the steer wheels tracking straight in the on-center driving position. Therefore, the unstable behavior of the steer wheels near the on-center position requires that they be constantly controlled by corrective driver steering input.

The inherent lack of steer wheel directional stability in the on-center driving position is made worse because the same slanted king pin angle that produces the turning-lift effect also produces a steer wheel castering effect that greatly adds to the unstable behavior of the steer wheels during crosswind and crowned road driving conditions. It is amazing that the adverse effect of steer wheel castering has failed to be better understood over the many years because of an original misleading choice of terms. It can be reasoned that in the beginning the shorter term, caster angle, was probably chosen over the more complex term, turning-lift angle, considering that the angles were one and the same.

For as long as anyone can remember, the standard reference for the required king pin angle in vehicle specification manuals has always been referred to in degrees of caster angle. Therefore, it is not surprising that it has been mistakenly assumed throughout the industry that steer wheel castering in some manner is beneficial to heavy vehicle drivability, when in fact the opposite is true. Accordingly, many of the text books and engineering papers that have been written about heavy vehicle steering geometry have repeated the mistaken assumption that castering the steer wheels makes a contribution to the directional stability of heavy over-the-road vehicles. Unfounded theories, attempting to explain how the castered wheel functions to make a vehicle directionally stable, have been repeated in various technical publications, greatly adding to the confusion.

It is also amazing how anyone whose desk chair has castered wheels, which allow the chair to move freely in any direction, could believe in some manner that, when applied to a highway vehicle, castering would keep the steer wheels tracking straight. Referring now to prior art FIG. 3, a castered wheel assembly 13 simply follows the lateral movement of a forward pivot axis A2 that is offset horizontally from a vertical axis A3 by a caster offset distance 6 between the arrows marked "Caster Offset". Axis A3 defines where a castered wheel 12 contacts the ground G, and arrow D3 indicates the direction of wheel rotation during forward lateral movement of wheel assembly 13. As applied to a highway vehicle, the pivot axis A1 of the slanted king pin 2 slants to intersect the ground G forward of where the steer wheel 3 contacts the surface of the ground as defined by a vertical axis A4. Axis A4 is offset horizontally from the pivot axis A3 by a caster offset distance 5 between the arrows marked "Caster Offset" in FIG. 1. Also in this figure, arrow D1 indicates the direction of wheel rotation during forward movement of steer wheel 3, arrow D2 indicates the direction toward which the wheel axle 7 rotates during a right turning movement of right front wheel 3, and 7', 2', 3' and A1' indicate the moved positions of the wheel axle, the king pin, the steer wheel and the king pin pivot axis, respectively, while the right turn is in progress.

A castered steer wheel therefore does not prevent lateral movement of a vehicle, which instead is actually guided by any force acting on the vehicle to cause lateral movement of the offset pivot axis A1. Therefore, during crosswind driving, the castered wheels of a heavy vehicle are guided down-wind by the lateral down-wind movements of the vehicle in response to crosswind gusts, thereby requiring repetitive driver steering corrections to maintain directional control of the vehicle. Crosswind driving is probably the most exhausting driving experience that heavy vehicle drivers must frequently endure because of the repetitive driver steering corrections required to keep the vehicle under control. Crosswind driving is therefore one of the major causes of driving fatigue and related heavy vehicle highway safety issues.

Heavy vehicle steer wheel footprint tests have been conducted using highly accurate instrumentation to measure and record steer wheel activity while driving. During the tests, experienced test drivers made a concerted effort to minimize the corrective steering input to only the amount required to maintain directional control. Any test data that was influenced by inadvertent driver over-steer was not used. Most of the test data was recorded at fifty five (55) miles per hour on a non-windy day on a smooth highway. Therefore, the data is considered to represent a best-case scenario.

According to the test data taken at fifty five (55) miles per hour, the left and right driver steering inputs required to correct the unstable behavior of the steer wheels varied from the on-center position thirty-five to forty thousandths (0.035–0.040) of an inch. When the test driver held the steering wheel steady instead of making the left and right steering corrections required to keep the vehicle directionally under control, the vehicle would make an undesired lane change when the steer wheels were off-center by thirty-five thousandths (0.035) of an inch. When the vehicle speed was increased to sixty-five (65) miles per hour, it only required the steer wheels to be directionally off-center fifteen to eighteen (0.015–0.018) thousandths of an inch to make an undesired lane change. During adverse road and wind conditions, the tests also demonstrated that the unstable steer wheel activity increased substantially, requiring a corresponding increase in driver steering inputs to maintain directional control.

The ideal driving situation is therefore one where the steering system inherently causes the vehicle to travel in an unswerving straight line unless the driver intentionally turns the vehicle in another direction. The ideal steering system should therefore require relatively little attention from the driver as the vehicle progresses along a straight line path down the roadway. From a steering standpoint, the vehicle should not respond to anything but the driver's steering commands and these must be of sufficient magnitude to overcome a significant resistance to turning away from center. In the absence of a steering input by the driver, the vehicle should literally do nothing but progress straight ahead.

SUMMARY OF THE INVENTION

The invention provides improved on-center control of the steer wheels, and significantly reduces driver fatigue because it results in a major reduction in driver steering inputs. The invention also eliminates the need for positive caster offset by providing directional stability of steer wheels with no positive caster, i.e., a caster angle of zero degrees (0°). Thus, on-center tracking of the steer wheels is achieved by a means that does not have the deficiencies inherent in positive caster offset and that substantially reduces the need for corrective steering inputs from the vehicle driver.

The positive on-center feel of such a directionally stable vehicle provides a new level of driveability for motor vehicles, including automobiles, trucks, buses, campers and motorized homes. The invention thus achieves new levels of directional stability and driveability, which reduce driver fatigue to a level that cannot be achieved by conventional positive caster centering. When a driver turns the steering wheel of modern over-the-road vehicles, power steering does the work. If these vehicles utilize the present invention and the steering wheel is released, the centering control system goes to work and makes the steered wheels track straight with great accuracy by counteracting spurious steering inputs as described below.

The centering unit section of the centering assembly includes a component that moves with the steering system in response to steering wheel movement, and resistance to movement of this component provides a resistance force opposing very small movements (preferably less than 0.001 inch, more preferably less than 0.0005 inch) of the steer wheels to either side of their center position. Small steer wheel movements in the range of 0.015 to 0.040 inch correspond to the very large radius turns that occur when a vehicle is steered through lane change maneuvers at highway speeds. Thus, during large radius turns, the centering unit provides a centering force that returns the steer wheels back toward their on-center position upon removal of the steering force producing the large radius turn.

The manner in which the present invention accomplishes the foregoing improvements and advantages will now be described. The resistance force is provided by a zero backlash hydraulic centering assembly that is preferably attached at one end to a fixed frame member and at the other end either to the steering gear pitman arm or directly to the steering system tie rod. The assembly comprises a centering cylinder defining two centering chambers, each containing a centering piston having a rest position against an annular stop that surrounds an enlarged head of a centering piston rod when it is in an on-center position. When the steered wheels are turned away from center, one of the centering pistons is displaced by the piston rod head. When the driver releases the steering wheel, the displaced piston returns the piston rod head and the steering system to their on-center positions.

A hydraulic pressure source maintains substantial pressure in the centering chambers on one side of each piston and this pressure causes the piston rod head to be captured within the annular stop to keep the steered wheels on center, tracking with accuracy that is not achieved with any other method. The hydraulic pressure source is preferably a gas over hydraulic pressure accumulator that includes a reservoir for the hydraulic fluid. Gas pressure from a pressurized gas source, such as an onboard air tank or compressor, a vehicle airbrake system or some other conventional air pressure source, is used to charge a gas pressure chamber on one side of an accumulator piston having a liquid pressure chamber on the opposite side of the piston. The liquid chamber is fed by a high pressure positive displacement pump that draws liquid from a separate liquid reservoir to further pressurize the liquid pressure chamber, which in turn causes a compressive movement of the piston that compresses the gas charge in the gas chamber and thereby increases its pressure. The separate liquid reservoir is maintained at ambient pressure by a filtered vent.

By selecting different gas charge pressures for the air chamber of the accumulator, the hydraulic fluid pressure and resulting forces applied to the dual pistons may be selected, thereby permitting selection of the resistance to off-center movement of the steering system, as well as the return force for recentering the steering system, according to the particular characteristics of the vehicle on which the control system is installed. A pressure relief valve may communicate with the gas chamber side of the accumulator piston to provide an upper limit to the resistance and return forces that may be generated by contact between the respective centering pistons and the piston rod head therebetween. Although the centering fluid is preferably a liquid pressurized by a gas such as air, the centering and pressurizing fluids may be either all liquid or all gas.

Because the centering rod is connected to a conventional steering lever known as the "Pitman arm", and fluid in the centering cylinders is pressurized by the accumulator, neither centering piston can move away from a rest position corresponding to the centered position of the centering rod head until a steering force exceeds the on-center holding force dependent on accumulator pressure and the size of the centering pistons. The level of steering force required to overcome the steer wheel centering force to initiate a steering movement away from center is sometimes referred to in this specification as the "on-center holding force" or the breakaway steering force. Different levels of steer wheel holding force may be appropriate to compensate for different vehicle weights and/or adverse unstable behavior of the steer wheels that the steering geometry does not control or prevent.

When a pressing force applied by the centering rod head in response to the steering force is sufficient to overcome the on-center holding force, the corresponding centering piston moves away from its center position and, during this compressive movement, it is continuously biased back toward its rest position by accumulator pressure. Thus, the centering force resists relative movement between each centering piston and its corresponding centering cylinder, and this resistance to relative movement between these members prevents any substantial movement of the steer wheels or other steerable member(s) away from their selected center position until the steering force applied to the steering system exceeds a predetermined value corresponding to the level of on-center holding force provided by the centering pistons. The centering force also produces a constant contact pressure between each centering piston and an intermediate annular stop ring that surrounds the rod head it its centered position.

The invention includes a trim assembly that allows small adjustments to be made in the center position of the steering system to fine tune steering of the vehicle. For this purpose, a remotely operable trimming means is provided for controllably varying the selected center position of the steerable member to be maintained by the control system. In particular, a trim rod connected to a trim piston is arranged for movement in either direction within a hydraulic trim cylinder. The distal end of the trim rod is pivotally connected to either the steering system or the vehicle frame, depending on which of these is opposite from the distal end connection of the centering rod. Hydraulic fluid from the fluid system accumulator assembly is supplied to opposite sides of the trim piston and its flow is controlled by a trim valve assembly located remotely from the trim piston and its cylinder and operated by a single trim solenoid to allow a movement of the trim piston and its rod that changes the overall length of the centering assembly and thereby the center position of the steering system connected thereto.

The trim cylinder is separate from, but integrally attached to, one end of the centering cylinder by an intermediate head. The trim piston preferably can move about one-half inch to about one inch to either side of its center position in the trim cylinder, i.e., the total stroke of the trim piston is preferably in the range of about one inch to about two inches. The hydraulic fluid in this short trim cylinder is trapped on opposite sides of the trim piston by the trim valve when it is closed, creating a hydraulic lock that holds the centering stop of the centering cylinder in a selected on-center position. When an electric trim button is activated, the solenoid operated trim valve opens, allowing fluid to pass from one side of the trim piston to the other. This causes the centering cylinder (and its centering stop) to move precisely by the amount necessary to coincide with the straight ahead direction that the vehicle is being steered. Releasing the trim button allows the trim valve to close, recreating the hydraulic lock in the trim cylinder to hold the centering assembly in the new on-center position to which it has been trimmed.

The average trim corrections may be on the order of a few one-thousandths of an inch. Such fine tuning of the on-center directional stability makes driving more pleasurable and less fatiguing. The steering control system of the invention thus comprises a centering unit having a center position that is adjustable to permit the on-center position of the steering system to be changed and reset (trimmed) to compensate for any change in the on-center trim condition that would otherwise cause the vehicle to deviate from its straight ahead course. Such "trimming" adjustments are made remotely to permit the center position maintained by the centering assembly to be fine tuned while the vehicle is in operation from a location near the driver, which is "remote" relative to the location at which the centering unit is connected to the steering system of the vehicle. Therefore, the driver easily trims out steering wheel pull by the simple touch of a trim switch.

A particularly important feature of the present invention is the location of the solenoid actuated trim valve assembly, which is mounted remotely for easy access and maintenance and is connected by hydraulic lines (conduits) to the intermediate head between the innermost centering chamber and the innermost trim chamber. This allows the trim valve assembly and its solenoid to be more easily handled, installed, and serviced without having to open the centering or trim cylinders. The hydraulic lines are preferably made of a material that is non-expandable, i.e. non-stretchable, both laterally and longitudinally so that the internal volume of these lines does not change with changes in internal pressure. Changes in volume with changes in pressure are undesirable because such volume changes may cause undesirable movement of the trim piston within the trim cylinder.

A liquid trimming fluid is preferred because it is substantially incompressible as compared to a gaseous trimming fluid and therefore provides the capability of locking the trim piston in its trimmed position without appreciable slack. With only an incompressible liquid in the trim valve assembly and in the trim chambers, closure of the trim valve creates a hydraulic lock that holds the steering system in the trimmed on-center position with zero backlash. The centering chambers may be pressurized by either a gas or a liquid and may be pressurized by an air supply system of the vehicle. However, the pressurizing centering fluid is preferably provided by a combination hydraulic fluid and gas pressurization system wherein a hydraulic fluid system is pressurized by an accumulator having a liquid reservoir at ambient pressure and a gas chamber containing a gas charge at a predetermined static pressure. When the control system is activated, a pump, preferably of the positive displacement type, is periodically operated to transfer liquid from the reservoir to the liquid side of an accumulator piston arranged for movement in a cylinder toward the gas side of the piston so as to substantially increase the gas pressure in the gas chamber. This increase in gas pressure stores energy for maintaining the liquid pressure at the same level and this increased liquid pressure is supplied to the centering cylinders for maintaining the on-center positions of the centering pistons and for supplying the return to center force when one or the other of these pistons is moved away from center by a steering force.

Regardless of the type of fluid pressurization system employed, the system should generate sufficient centering fluid pressure to return each centering piston to its rest position fully seated against the stop ring upon cessation of intentional steering inputs. Spurious steering inputs tending to move the tie rod in either direction are therefore resisted by a corresponding on-center holding force generated by accumulator pressure acting against the centering pistons via their corresponding centering chambers. Only when intentional steering wheel forces exceed a preselected on-center holding force level will the pitman arm of the steering system generate sufficient linear force on the centering rod to move one or the other of the centering pistons away from its seated, on-center position.

A driver control panel facilitates making centering trim corrections while driving the vehicle. The panel may be conveniently located near the driver and provides at least two basic functions, namely, a switch to turn the system on and off, and a momentary trim switch. Activating, adjusting and trimming the centering system is therefore an easy and natural driving function. Should the driver observe any amount of left or right steering wheel displacement required to keep the vehicle tracking straight it is then easily eliminated by pressing the trim switch. This switch preferably has a toggle that is biased by a spring to the circuit opening position. These types of switches are closed only momentarily when the toggle is held in a depressed position against the spring bias. Thus, the solenoid of the trim valve is actuated only while the toggle is actually depressed. Release of the toggle opens the circuit and stops the trimming adjustment at the point selected.

Optionally, the control panel may also include a fluid pressure gauge and a gas pressure regulator connected between the gas chamber and an onboard compressed gas system that permits the level of resistance to movement away from center and the level of return force to be controllably varied by hand adjustment of a control knob on the regulator. Alternatively, the panel may be provided with a switch for remotely actuating the liquid pump, thereby providing another means for manually controlling centering fluid pressure from the driver's station of the vehicle. Therefore, the level of resistance to movement away from center may be remotely adjusted by a manual control system operable by the driver. As a further alternative, either the regulator control or the pump control may be driven by a solenoid or reversible electric motor responsive to a microprocessor control system for controlling centering system pressure in response to the output of a vehicle speed sensor. Thus, the on-centering force of the present invention may be readily adjustable to provide a low level at lower speeds and a high level at higher speeds, such as above about 35 mph.

The system parameters may be chosen so that a total on-center holding force of at least 100 pounds, preferably at least 200 pounds, and more preferably at least 300 pounds must be applied to the tie rod in order to overcome the on-centering holding force of the steer wheels at vehicle speeds above about 35 miles per hour. For city driving at vehicle speeds of about 35 miles per hour or less, the on-center holding force may be eliminated by turning off the control system at the control panel or, if using a remotely adjustable centering pressure option, the holding force may be lowered to about 100 pounds, more preferably below about 50 pounds, at the tie rod. The centering unit for powered steering systems may be left on continuously because it will automatically turn off with the ignition and come back on when the engine is started. With any malfunction of the vehicle's power steering, an automatic disabling feature may be provided to shut the system completely off.

The centering unit overrides spurious inputs to the steering system of vehicles with positive caster offset so that constant manipulation of the steering wheel by the driver is no longer required to hold the vehicle on a true straight ahead course. When used on steering systems with zero caster offset or with negative caster offset, the invention provides the driver with a positive touch control not heretofore attainable with those types of systems. Positive stability is thereby achieved for otherwise marginally stable or previously unstable steering systems. The invention also provides a distinctive feel when approaching or leaving the center position. Thus, the sense of touch is added to the visual sense to aid control of the vehicle and reduce driver fatigue. The on-center holding force selected should satisfy the road feel desired by the driver and be sufficient to overcome anticipated spurious inputs.

The control system is useable with both power and non-powered steering systems, with the level of centering forces provided usually being less for vehicles without power steering. The invention may be used on steering systems with or without a reduction gear between the steering wheel and the steer wheels. In the former application, the centering unit is preferably connected to the steering system at a location between the steer wheels and the reduction gear, such as to the pitman arm as mentioned above, so as to be unaffected by any slack in the reduction gear or in components and connections between the reduction gear and the steering wheel. It is therefore preferably installed on the slow side of the reduction gear ratio in order to provide a zero backlash centering unit. The invention is particularly advantageous for large over-the-road motor vehicles, where its use may reduce tire wear by as much as fifty to seventy percent (50–70%) by preventing oscillations of the steer wheels due to steering system geometry and/or driving conditions.

The centering assembly of the control system is preferably connected between the steering system and the front axle or a nearby frame member of the vehicle in a position that allows the steerable member to move through its full range of steering movements while providing sufficient leverage for the assembly to resist movement of the steerable member away from the center position producing straight ahead travel of the vehicle. The steering system connection may be made to any steering system component providing appropriate range and leverage, such as a tie rod which joins the two front steerable wheels of a highway vehicle, or the pitman arm connected to the reduction gear. The frame connection may be made to any component serving as a fixed mounting relative to the steering system.

This fixed component may be a frame member, or the front axle or some other part fixed to the vehicle frame instead of an actual frame member.

Although the present invention is particularly useful as a centering mechanism for the steering systems of motor vehicles, it can be employed to position any steerable member moveable to either side of a preselected position. For example, the control system can keep an outboard motor centered so that a boat follows a straight course over the water in the presence of spurious steering forces produced by wind and wave action. The control system can also be used to center such steerable members as the rudders of ships or airplanes and the tongues of tandem trailers or railway cars.

From the consumers' point of view, the present invention, as well as my prior disclosures of PSWCT, solves a number of over-the-road heavy vehicle operational problems, and the cost of its installation may more than be paid for by the savings in steer wheel tire expense alone because it provides precision steer wheel control that greatly reduces or substantially eliminates excessive steer wheel tire wear. These results are achieved because my PSWCT prevents the steer wheels from castering, thereby alleviating or eliminating the drivability problems that have been caused by steer wheel castering. The system also makes the steer wheels track straight by returning them to and/or holding them in their true centered position, thereby doing away with the unstable behavior of the steer wheels that is inherent to the hundred-year-old farm gate turning-lift technology. The present invention thereby accomplishes one or more of the following improvements in steer wheel control:

(a) advances the state of the art in heavy vehicle directional stability by keeping the steer wheels tracking straight with a high level of precision, greatly reducing the repetitive driver steering input required to maintain directional control, and thereby doing away with long overlooked steering wheel adverse ergonomics problems and making a major reduction in driving fatigue;

(b) achieves relatively easy vehicle controllability during steer wheel tire blowout, and therefore avoids the need for the usual steering wheel fight;

(c) makes a considerable improvement in crosswind drivability by preventing the steer wheels from downwind caster steering in response to wind gusts, thereby making a major reduction in crosswind driving fatigue;

(d) provides heavy vehicle directional stability that greatly reduces the potential for driver over-steer that can easily start an over-steer chain reaction of the type responsible for many loss-of-control highway accidents, and thereby also makes driver training safer and less costly;

(e) significantly reduces or substantially eliminates road wander that is caused by the unstable behavior of the steer wheels that conventional steering geometry does not control or prevent;

(f) does away with steering wheel pull on crowned or slanted roads that is caused by steer wheel caster steering to the low side of the road;

(g) substantially reduces related heavy vehicle accident potentially by reducing driving fatigue;

(h) makes team driving safer because the driving is easier and less fatiguing to the on-duty driver and the off-duty driver gets more rest and sleep due to the non-swaying, directionally stable ride;

(i) makes trucks pulling multiple trailers much less fatiguing and safer to drive, and also much easier for other vehicles to share the highway with because the trailers stay in line with the non-swaying, directionally stable truck; and, (j) provides a solution to the costly steer wheel tire wear problem that has long been an added expense to heavy vehicle operators.

The invention thus greatly reduces tire wear of the steer wheels. Tests of my PSWCT suggest improvements in steer wheel tire service life for over-the-road heavy vehicles in the range of about fifty-five percent to about seventy percent. Heavy vehicles using this technology have exhibited a smooth, non-cupping steer wheel tire wear pattern instead of the costly irregular wear pattern of the past. Unlike the puzzling steer wheel tire wear problem that has perplexed the heavy vehicle industry for years on end, the explanation of how my PSWCT solves the problem is uncomplicated and easy to understand. First, the costly irregular tire wear pattern only occurs on the front steer wheels due to the unstable behavior inherent in conventional steering geometry. Second, when this unstable behavior of the steer wheels is prevented by my PSWCT, these wheels are made to track in a directionally stable manner with the same precision as the wheels on the nonsteering rear axles. Therefore, the tires have the same smooth wearing tread and the same normal extended service life as those on the fixed non-steering rear axles.

BRIEF DESCRIPTION OF THE DRAWINGS

The invention, both as to its structure and operation, may be further understood by reference to the detailed description below taken in conjunction with the accompanying drawings in which:

FIG. 5 is a schematic diagram of the fluid and electrical systems and of the major components of the invention, and includes sectional views showing structural details of the accumulator, the centering unit and the trim unit;

DETAILED DESCRIPTION OF THE INVENTION

Figure 1:
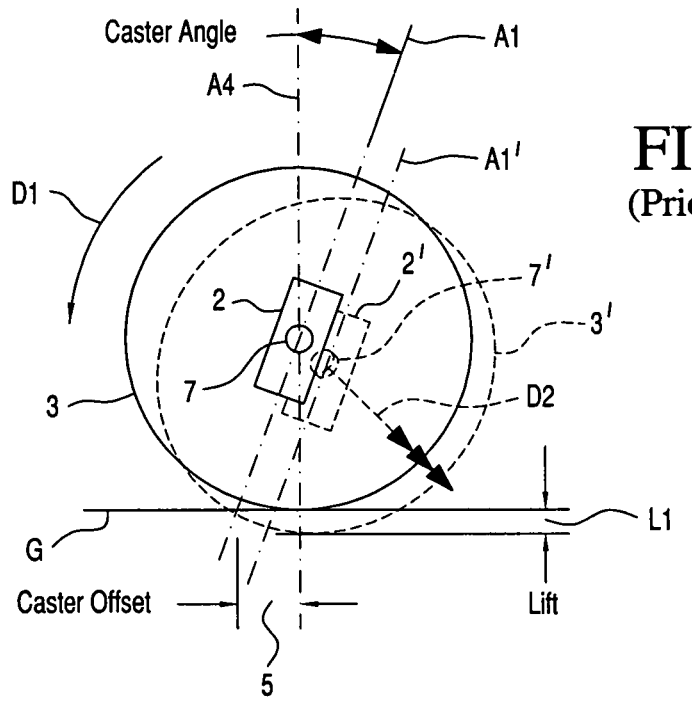
FIG. 1 illustrates the turning of a prior art castered steer wheel.
Figure 2:
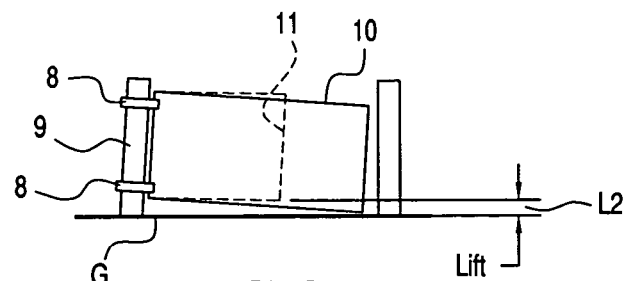
FIG. 2 illustrates the opening of a prior art roadway gate hinged on a slanted post.
Figure 3:
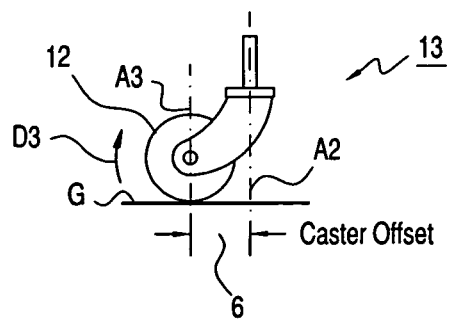
FIG. 3 illustrates a prior art caster wheel.
Figure 4:
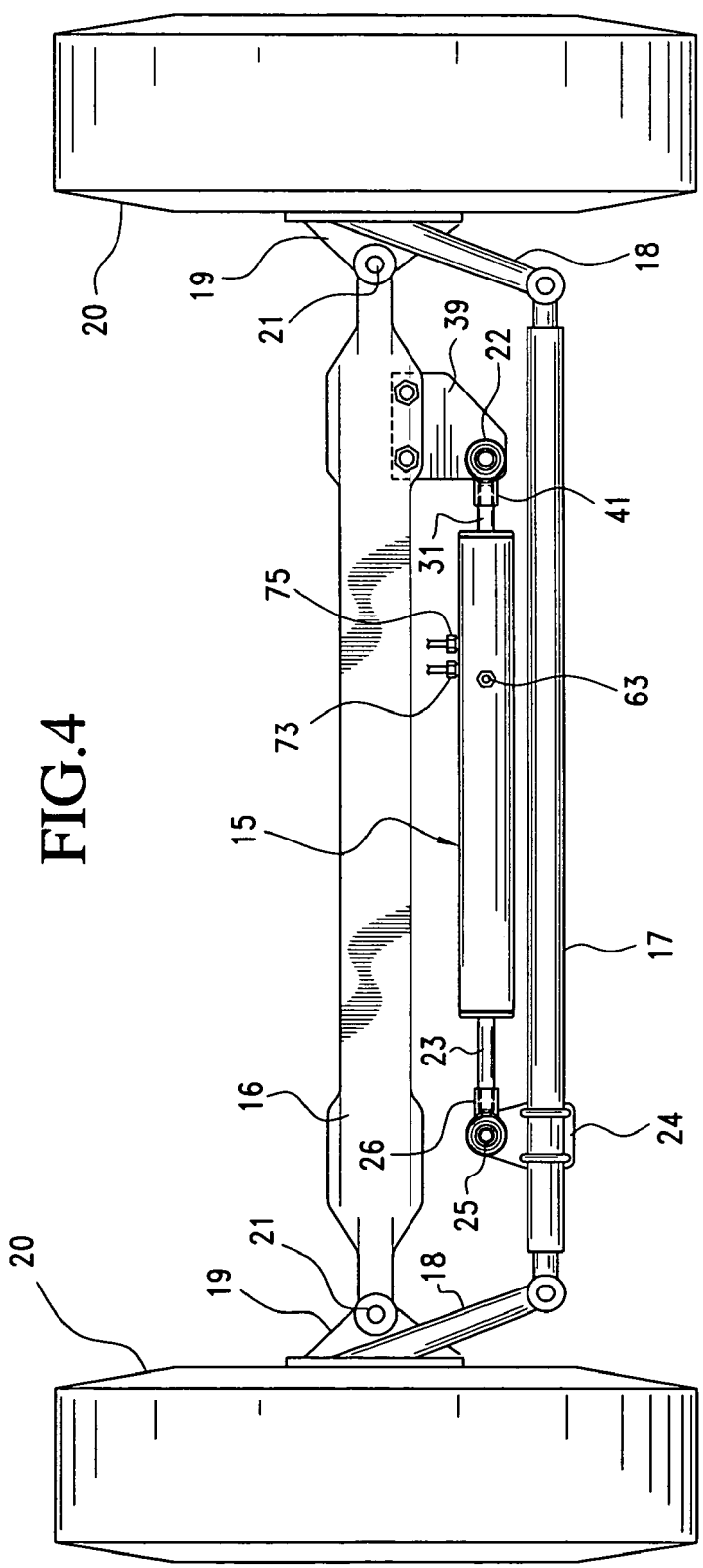
FIG. 4 is a plan view illustrating installation of the centering assembly of the invention between the frame and steering system of a motor vehicle.

The precision steer wheel control system of the present invention comprises a steer wheel control system, generally designated 15, which includes a centering unit 28 and a trim unit 30 that form a composite assembly that may be connected between the front axle 16 and the tie rod 17 of a conventional motor vehicle as shown in FIG. 4 of the drawings. The steering system components shown are conventional and include bell cranks 18,18 carried by knuckles 19,19 which support steer wheels 20,20 for pivotable turning movement about kingpins 21,21 mounted on the vehicle frame. Steering inputs by the driver are transmitted to the tie rod 17 by the pitman arm (not shown) of the steering gear.

Figure 6:
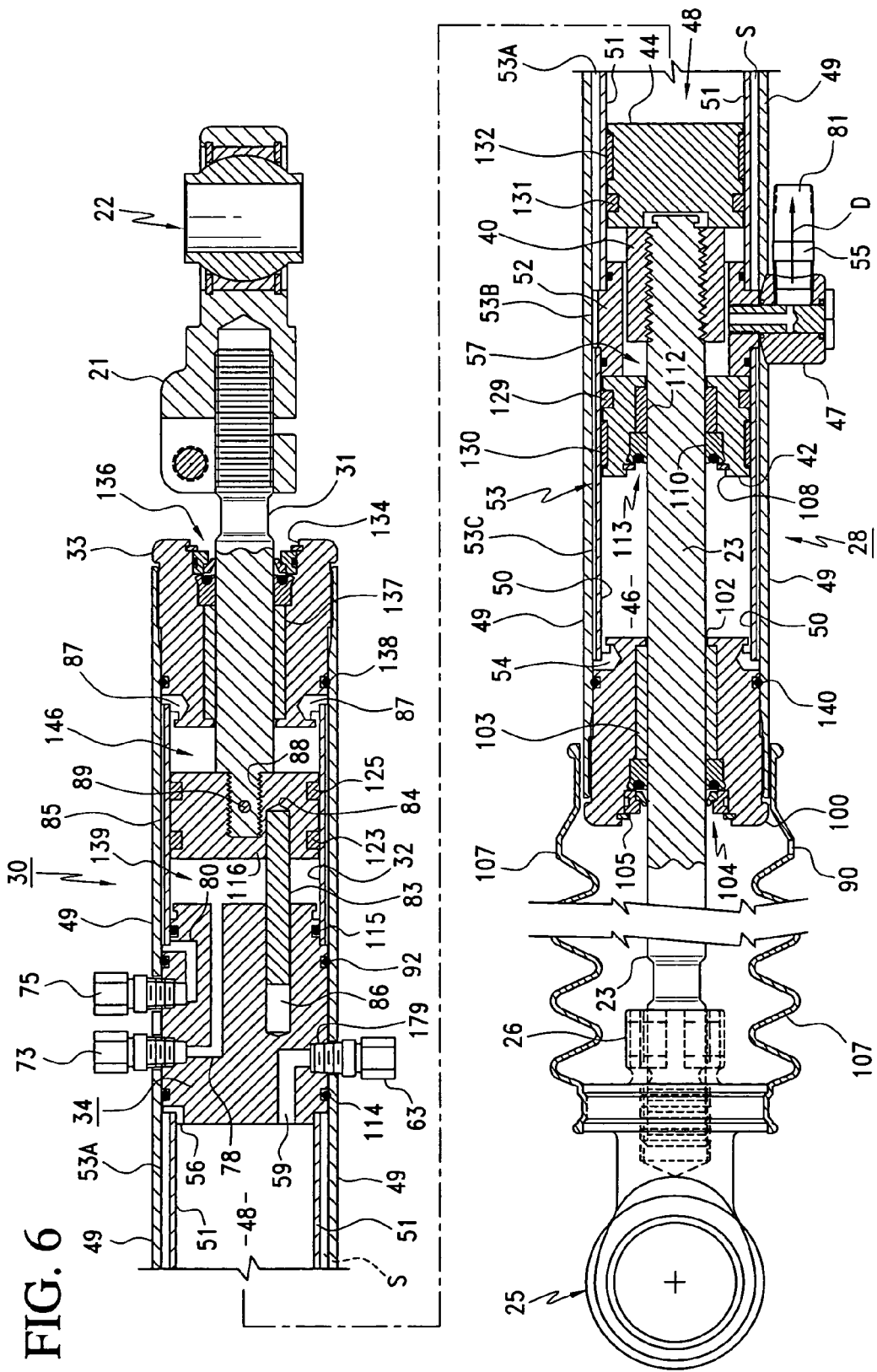
FIG. 6 is an enlarged partial sectional view of the centering and trim units of FIG. 5.

The outer end of a centering rod 23 of centering unit 28 is connected to the tie rod 17 by means of a mounting bracket 24 that carries the ball element of a ball joint 25 connected to the outer centering rod end by a connection 26 threaded or clamped thereon (FIG. 6). Similarly, the outer end of a trim rod 31 of trim unit 28 is connected to the axle 16 by means of a mounting bracket 39 that carries the ball element of a ball joint 22 connected to the outer trim rod end by a connection 41 threaded or clamped thereon. The ball joints 22 and 25 permit pivotal movement in the horizontal plane and to a limited extent in the vertical plane, and are conventional joints wherein an enlarged spherical end on a rod or stub is held for pivotal movement within a surrounding journal structure carried by an arm-like member. In FIGS. 5 and 6, the ball joint 25 is shown as if rotated 90 degrees from its true operating position, which is in the horizontal plane the same as ball joint 22, to illustrate a top view of these joints.

As may be seen best in FIGS. 5 and 6, the trim unit 30 includes a trim rod 31, a trim cylinder 32 having an end head 33 and an intermediate head 34. A remote trim valve assembly 35 is connected to the intermediate head 34 by fluid conduits 67 and 71 as described further below. The trim valve member of assembly 35 is actuated by a solenoid 36 in response to a driver of the vehicle pushing the button 29 of a trim switch 37 on a control panel 38, which is preferably located at or near the driver's station of the vehicle. The components mounted on the driver control panel 38 make it possible for the corresponding steering corrections to be made while driving the vehicle. Should the driver sense a degree of steering wheel pull that becomes a bother, it is then quickly eliminated by pressing the trim button 29. The electrical trim switch 37 preferably has a toggle design in which button 29 is spring-biased to a circuit-open position. Such switches are closed only momentarily when the toggle button is held in a depressed position against the spring bias. Thus, the trim adjusting solenoid 36 is actuated only while the toggle button 29 is depressed. Release of the button opens the circuit and stops the trim adjustment at the point selected.

The components of the centering system and the way in which they center and stabilize a vehicle steering system will now be described. It is to be understood that each of the components described are connected together by appropriately sized fluid conduits and electrical wires and that these conduits and wires are represented by the lines interconnecting the components as shown.

Referring again to FIGS. 5 and 6, there is shown a specific structural arrangement of the components preferably incorporated in or attached directly to the centering unit 28. A cylindrical assembly housing 49 encloses two separate interior centering cylinders 50 and 51, the adjacent ends of which are connected together by a collar 52. The centering cylinders 50 and 51 contain centering pistons 42 and 44, respectively. An enlarged rod head 40 is keyed and fastened to the inner end of centering rod 23. Rod head 40 is positioned between opposing faces of centering pistons 42 and 44 and serves as the actuator for these pistons.

A drain fitting 47 is carried by collar 52 and contains a check valve 55 to allow any inwardly leaking centering fluid to leave the space 57 between pistons 42 and 44 as they reciprocate in cylinders 50 and 51. Although fitting 47 could vent via a breather line to a vent reservoir (not shown), it preferably vents directly to ambient in the direction of arrow D, and check valve 55 is provided to prevent a reverse flow of ambient air from entering the space 57 between the centering pistons. Even though a compressive piston movement away from center will cause a vacuum in space 57 due to check valve 55, this vacuum increases the resistance to turning movements of the steer wheels by only a small percentage (less than about 5%) of that provided by centering chamber pressure. The end portion of centering rod 23 projecting beyond assembly housing 49 may optionally be surrounded by a dirt and grease barrier in the form of a flexible bellows 82, which is vented to ambient via a breather aperture 90. As the pistons 42 and 44 move in response to steering movements, ambient air flows back and forth through breather aperture 90.

The end of cylinder 50 opposite to collar 52 is closed by a head 100 having a journaled and sealed aperture 102 for sliding passage of centering rod 23. Around aperture 102 is a set of multiple seals 104 held in place by a snap ring 105, and the head 100 is secured in place by being threaded or crimped into the assembly housing 49. Piston 42 has a sealed aperture 108 for sliding passage of centering rod 23 during its movement of piston 44. A piston rod seal 110 and journal 112 are secured in piston 42 by a snap ring 113.

The end of cylinder 51 opposite to collar 52 is closed by the intermediate head 34 of trim cylinder 32, and these two centering cylinders, the intermediate head, and the trim cylinder 32 are all secured together by the outer end heads or caps 33 and 100, which are threaded or crimped into the housing 49 at positions beyond seal rings 138 and 140, respectively. In FIG. 6, centering piston 44 is shown moved away from collar 52 by piston head 40 and centering piston 42 is shown in its fully retracted position against collar 52. Both pistons are arranged for compressive movement toward the opposite ends of their respective chambers, piston 42 traveling in chamber 46 and piston 44 traveling in chamber 48 within cylinders 50 and 51, respectively. Centering fluid can flow back and forth between chambers 46 and 48 through a connecting arcuate conduit 53, which is made up of three arcuate segments each formed on the outside by a cylindrical casing 49, segment 53A being formed on the inside by cylinder 51, segment 53B being formed on the inside by collar 52, and segment 53C being formed on the inside by cylinder 50.

The retracted position of each piston is defined by the internal annular collar 52, which serves as a stop ring for centered pistons 42 and 44 and preferably has an axial width substantially (preferably within one-ten thousandth of an inch) equal to the axial thickness of rod head 40. A stop width greater than the head thickness is undesirable because gaps between opposing surfaces would allow unbiased movement (slack) between rod 23 and cylinders 50 and 51. A stop width less than the head thickness is also undesirable because this would let fluid flow back and forth between chambers 46 and 48 through the connecting conduit 53 so that the pistons 42 and 44 would move (drift) together until one of them bottoms out against the collar 52, there being no pressure differential applied to the rod head during such joint piston movement. Accordingly, the pressurization system constantly biases the centering pistons into substantially simultaneous engagement with both the centering stop and the piston rod head at all times when the control system is activated and the steering system is in its center position so that there is no significant slack or drift at any time during its operation.

Near the end of each centering chamber opposite to the retracted piston position is a single port for communicating fluid pressure to the chamber, port 54 serving chamber 46 and port 56 serving chamber 48. Ports 54 and 56 are connected together by the conduit 53, which in turn is connected via chamber 48, an intermediate head passage 59, a fitting 63 and a hydraulic conduit 58 to an accumulator assembly, generally designated 62, which provides hydraulic fluid under pressure to the centering chambers 46 and 48. The vehicle steering system is properly centered when pistons 42 and 44 abut collar 52. In order to move or break away from collar 52, these pistons must overcome the resistance provided by accumulator pressure acting through the conduit 58.

The fitting 63 may contain a check valve and orifice arrangement such that the orifice will function as a one-way flow restriction to control the rate of fluid flow out of the respective centering chambers 46 and 48. This orifice arrangement is shown and described in parent application Ser. No. 10/953,965 filed Sep. 28, 2004, which is incorporated herein by reference. In accordance with fluid dynamics, this orifice arrangement provides a level of flow resistance that varies in response to the rate of piston movement, and the orifice is preferable sized to prevent excessively rapid (unsafe) movement of either of the centering pistons and its corresponding steer wheel away from their center positions during a severe blowout of one or both of the steer wheel tires. Thus, the orifice enables the driver of a vehicle utilizing the present invention to readily maintain safe control of the vehicle during an unexpected blowout of a steer wheel tire. This orifice function also may be achieved by appropriate sizing of the head passage 59 and the fittings at each end of conduit 58.

An optional feature of the centering unit is that the diameters of centering cylinders 50 and 51 may be different, the diameter of cylinder 50 being larger by an amount sufficient to produce equal centering forces on pistons 42 and 44 in spite of the area of piston 42 lost because the centering rod 23 passes therethrough. Thus, to provide equal working areas, the cross-sectional area of cylinder 50 and the annular surface area of piston 42 may be greater than the corresponding areas of cylinder 51 and piston 44 by the amount of piston area lost by reason of rod aperture 108 in piston 42. This is illustrated in FIG. 6 by the space S between centering cylinder 51 and assembly housing 49, which is substantially greater than the corresponding space between centering cylinder 50 and assembly housing 49.

The accumulator assembly 62 comprises a liquid reservoir 60 having an air and liquid chamber 77 defined by a cylindrical wall 60', and a pressurizable container 68 having a gas pressure chamber 66 and a liquid pressure chamber 70 formed by a cylindrical wall 68'. Chambers 66 and 70 are on opposite sides of a piston 69 moveable vertically in the cylinder formed by the wall 68' and having two separate annular seal rings 81 and 82 for preventing liquid leakage into gas chamber 66. Although the entire length of wall 68' is shown as being cylindrical, only the portion in which piston 69 is to reciprocate needs to have the same cross-sectional shape as the piston and the remaining portion may have other shapes. Chamber 70 receives relatively high pressure liquid from a positive displacement gear pump 92 that draws the liquid at ambient pressure from reservoir 60 via a conduit 96. This pump increases the liquid pressure and discharges to chamber 70 via a line 97 containing a pressure switch 95 and a check valve 91, which prevents reverse flow from the chamber to the pump. Switch 95 is arranged to cut off the motor 99 when the desired liquid pressure is reached in conduit 97. The liquid in chamber 70 is maintained at a pressure substantially higher, preferably by a factor or two or more, than the initial pressure of the gas charged into chamber 66.

Although the resistance fluid could be a gas, a liquid resistance fluid is preferred because it provides a viscous dampening action for tire blowout protection as the liquid is forced to flow through the various ports and passages between centering chambers 46 and 48 and between these chambers and accumulator 62. A liquid trimming fluid is preferred because it is substantially incompressible as compared to a gaseous trimming fluid and therefore provides the capability of locking a trim piston 116 in its trimmed position without appreciable slack.

Accumulator 62 also includes an upper head 93 and a lower head 94 spaced apart by parallel tubes forming cylindrical walls 60' and 68' and secured together by peripherally spaced bolts which are not shown. Gas pressure chamber 66 is filled from a compressed gas source via a Schraeder type air valve 163, such as used for filling vehicle tires. Reservoir chamber 77 is open to ambient pressure via a fitting 165 containing a filter 166.

The gas pressure in chamber 66 is indicated by a pressure gauge 164, which is connected to a passage in head 93 by a fitting 170. The gas is preferably air, and both the walls 60' and 68' of accumulator 62 are preferably cylindrical, although they could have other shapes. The gas pressure source for pressurizing chamber 66 may be a conventional source of dry pressurized air, such as an onboard compressor, a vehicle airbrake system or some other conventional air pressure source, such as those used to fill vehicle tires.

The trim valve assembly 35 includes a valve member 222 and a valve seat 225 and these components are mounted on a manifold or valving block 140 by a pedestal-like fitting 160 having a socket 45 for receiving a base portion 226 of the solenoid 36, this base portion having threads that are engaged by corresponding threads along an inner socket portion near its bottom. This arrangement provides a remotely located trim valve structure in which the solenoid 36 and other components of the trim valve assembly are easily handled, installed and serviced without having to access, open or otherwise disturb the centering or trim units.

Centering cylinders 50 and 51, trim cylinder 32, trim valve assembly 35 and accumulator 62 are preferably positioned relative to each other, and conduit 58 is arranged, such that any gas bubbles in the cylinders and trim valve flow through conduit 58 and into the accumulator reservoir 77 via a three-way valve 64 when it is positioned to connect conduit 58 to a reservoir conduit 72. Upon entering reservoir 77, any gas bubbles rise to the liquid and gas interface F1 such that the gas accumulates in an upper portion of the reservoir and is vented to ambient via a fitting 165.

Trim valve assembly 35 also includes a trim reservoir 196 having a tubular wall 196' that forms a trim reservoir chamber 198 for absorbing fluctuations in trim fluid flow due to the presence of trim rod 31 in trim chamber 146. Reservoir 196 has a bleed valve 197 for bleeding off air during filling of the trim system. Also, a bleed flow path through vent fitting 165 and filter 166 allows accumulator reservoir chamber 77 to be partially filled with hydraulic fluid up to the level of the top of a fill tube 74. These features insure precision trimming without backlash or drift of the center position, which otherwise could be caused by gas bubbles in the trim cylinder. These features also eliminate the need for a service air bleeding operation after the system is filled with original or replacement hydraulic fluid via reservoir 77, the fill tube 74 of which is closed by a threaded cap 79. In other words, the invention may comprise a self-bleeding arrangement that assures a bubble-free system capable of holding a close centering tolerance automatically.

Gas pressure in chamber 66 acts through piston 69 to store fluid energy received from the hydraulic side of the system, and to maintain fluid pressure on the liquid side of the respective pistons 42 and 44 until such time as access to pressurized liquid in chamber 70 is blocked and pressure in centering chambers 46 and 48 is released to ambient atmosphere by actuation of a three-way valve 64 to connect conduit 58 to conduit 72 instead of conduit 65 in response to a loss of electrical power, such as by turning off the system with an on-off switch 90. More specifically, valve 64 has a rotary element 64' that is held in the position shown in FIG. 5 by a solenoid and is biased by a spring (not shown) to rotate 90 degrees in the direction of arrow R when electrical power supplied to it by a line 194 is interrupted for any reason, such as by cutting off the control system 15 with switch 90 on panel 38. One side of switch 90 is connected to an electrical power buss 101 by a line 103 containing a circuit breaker 105, and the other side of switch 90 via a line 189 is connected to a distribution buss 190. Line 194 in turn is connected to buss 190, which also supplies electrical power to the motor 99 of the pump 92 and the pump discharge pressure switch 95 via a line 191. Switch 95 is arranged to cut off the motor 99 when the desired liquid pressure is reached in conduit 97 connecting the pump to the liquid pressure chamber 70.

Figure 7:
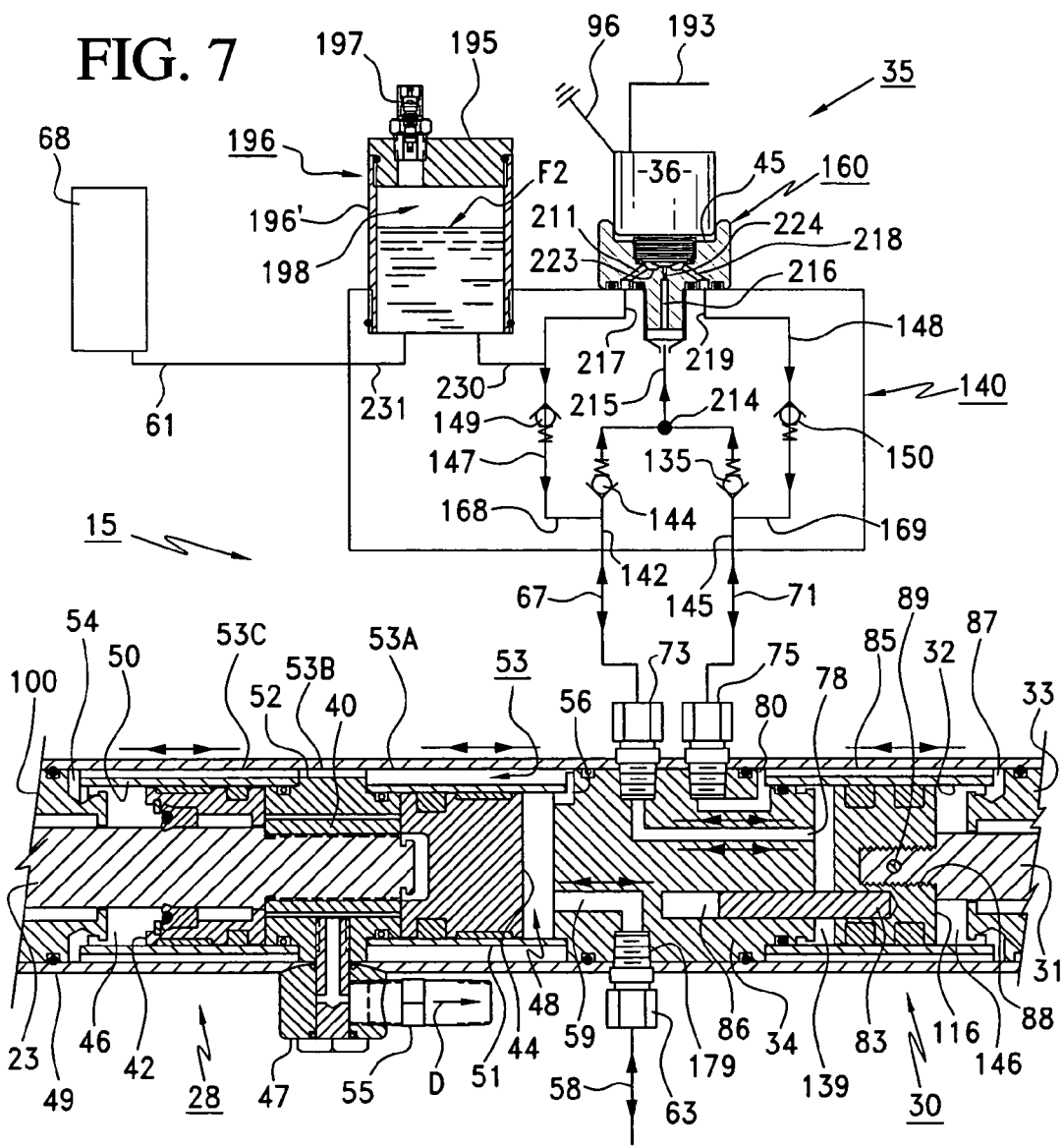
FIG. 7 is a schematic diagram of the hydraulic fluid system, including the fluid passages and valves of FIG. 5; and, FIG. 8 is an enlarged sectional view showing details of the remote trim valve assembly for controlling fluid flow to and from the trim piston assembly of the trim unit.

The gas pressure, preferable air pressure, in gas chamber 66 of accumulator 62 is initially charged after the resistance and trim systems have been bled and completely filled with liquid, preferably hydraulic fluid, to about the levels shown by F2 in FIG. 7 and by F1 and the position of piston 69 in FIG. 5. Trim chamber 198 and reservoir chamber 66 are charged to about the same pressure, preferably about 150 psig, through respective Schraeder valves 197 and 163. In the absence of leakage, these chambers do not have to be recharged each time the system is turned on, thereby eliminating a frequent recharge maintenance function. Thereafter, when on-center steering is desired, switch 90 on control panel 38 is turned on to activate the motor 99 of a positive displacement gear pump 92, which then draws fluid from chamber 77 via a line 96 and discharges this fluid to piston chamber 70 at a pressure preferably at least about twice that of the gas pressure charge, i.e., at a liquid pressure of at least about 300 psig. This higher liquid pressure causes upward movement of piston 69 in the direction of arrow P, which compresses the gas charge in both chambers 66 and 198 and thereby stores the energy providing the turning resistance force to centering pistons 42 and 144. A pressure relief valve (not shown) may communicate with the gas pressure chamber 66 of the accumulator to provide an upper limit to the resistance and return forces that may be generated by contact between the respective pistons and the piston rod head therebetween.

As it is best to deactivate assembly 15 in the event of a failure of the power steering system, a switch 152 for interrupting electrical power to solenoid actuated 3-way valve 64 and pump pressure cutoff switch 95 may be provided for vehicles with power steering systems. Switch 152 is mounted on a pressure sensor 153 located in a hydraulic line 154 in fluid communication with the outlet of the power steering pump (not shown). A loss of power steering pressure causes switch 152 to open, thereby causing pressure switch 95 in discharge line 97 to cutoff centering pump 92 and also causing valve member 64' of 3-way valve 64 to rotate clockwise (by 90° in the example shown). This valve member rotation shuts off liquid pressure conduit 65 and release liquid from line 58 to ambient pressure via line 72 and reservoir 77, which in turn depressurizes centering chambers 46 and 48. As a failsafe backup, a second power interrupt switch 187 mounted on a second pressure sensor 188 may be provided in power steering hydraulic line 154 and connected between on-off switch 90 and buss 190.

Pump pressure switch 95 has a cutoff element 192 responsive to pump discharge pressure and this element may be adjusted to set the pressure in chambers 66 and 70 at which the pump motor 99 is turned off. Thus, accumulator 62 allows hydraulic pressure in the centering chambers 46 and 48 to be precisely controlled over a relatively wide range because the gas trapped in gas chamber 66 provides a spring-like return force and this chamber may be sized such that the return force does not vary significantly with compressive piston movement. Gas chamber 66 and the stroke of piston 69 should be large enough for liquid chamber 70 to receive the entire volume of fluid from either centering chamber 46 or 48 without bottoming out the piston against upper head 93. By changing the gas pressure charge in gas chamber 66 and/or the setting of pump pressure switch 95, the turning resistance and the centering return force produced by the centering assembly of the invention can be increased or decreased as desired, depending on the size, weight and steering geometry of a particular type of vehicle.

For lighter vehicles, such as automobiles and pickup trucks, the accumulator pressure and other control system parameters may be chosen so that a linear turning steering force of at least about 30 pounds, preferably at least about 50 pounds, more preferably at least about 100 pounds, and most preferably at least about 150 pounds, must be applied to the tie rod by the pitman arm in order to initiate a turning movement of the steer wheels away from center. For heavier vehicles, such as eighteen wheel trucks and motor homes, these parameters may be chosen to require a linear turning turning steering force of at least about 200 pounds, preferably at least about 300 pounds, and more preferably in the range of about 300–500 pounds.

These turning forces are opposed by equal turning resistances that are maintained throughout all turning angles while the control system is turned on. Thus, after breakaway, accumulator pressure acting on the off-center piston provides a return force that may be effective over the entire range of turning angles, which for highway vehicles is usually limited to about 45° on either side of the center wheel position (the 0° position). For large turning angles, such as used for city driving, the switch 90 may be turned off to deactivate the system. After linear movement of the rod head 40 is initiated upon breakaway, the steering force required to sustain movement is a function of the pressure in the accumulator, as well as of other centering phenomena acting on the steering system, such as positive wheel caster.

The centered steering position to be maintained by the centering unit 28 described above may be changed remotely by the trim assembly described below. The intermediate head 34 engages trim cylinder 32 beyond the inner end of centering cylinder 51 as shown in FIG. 6. Trim cylinder 32 contains the trim piston 116 that is secured and keyed to the inner end of the trim rod 31, and cylinder 32 and piston 116 together define a pair of opposing trim chambers 139 and 146.

For sealingly engaging trim cylinder 32, trim piston 116 carries two sets 123 and 125 of dual circumferential seals, each set comprising an outer seal of square cross section concentrically stacked on a more resilient seal of oval cross section to provide a close tolerance seal arrangement for substantially preventing any leakage of trim liquid past the trim piston. This precludes any significant drift of trim piston 116 away from its locked position for setting the on-center position of centering rod head 40. Similar sets 129–130 and 131–132 of close tolerance, dual circumferential seals are also preferably provided on centering pistons 42 and 44, respectively.

Trimming chamber 139 is closed at its inner end by the intermediate head 34 and trim chamber 146 is closed at its outer end by the end head 33, which is secured in place by a threaded or crimped connection to the housing 49. The trimming rod 31 passes through an aperture 134 in end head 33 and this aperture contains a set of multiple seals 136 and a journal 137. An O-ring seal 138 is provided between head 33 and housing 49, and an O-ring seal 140 is provided between opposite end head 100 and housing 49. Additional O-ring seals 92 and 114 are provided on the intermediate head 34 as indicated by the small black circles in the cross-sectional view of this head in FIG. 6.

A dogleg head passage 78 in the body of intermediate head 34 provides a 2-way flow passage between a fitting 73 and trim chamber 139 on one side of trim piston 116, and a U-shaped head passage 80 provides a 2-way flow passage between a fitting 75 and a trim chamber 146 on the other side of trim piston 116 via an end head port 87 and an arcuate housing passage 85. Arcuate passage 85 is formed by the radial spacing between the housing cylinder 49 and the trim cylinder 32. Inward and outward fluid flow through these 2-way passages is controlled by the remote and solenoid actuated trim valve assembly 35 to prevent retraction and extension, respectively, of trimming rod 31, when this valve is closed. As an alternative arrangement, the fittings 73 and 75 and the passages 78 and 80 may be provided in another member of the trim cylinder closure means, such as the end head 33 in which a passage like passage 78 could provide a 2-way flow passage for trim chamber 146 and a passage like passage 80 could provide a 2-way flow passage for trim chamber 139.

Figure 8:
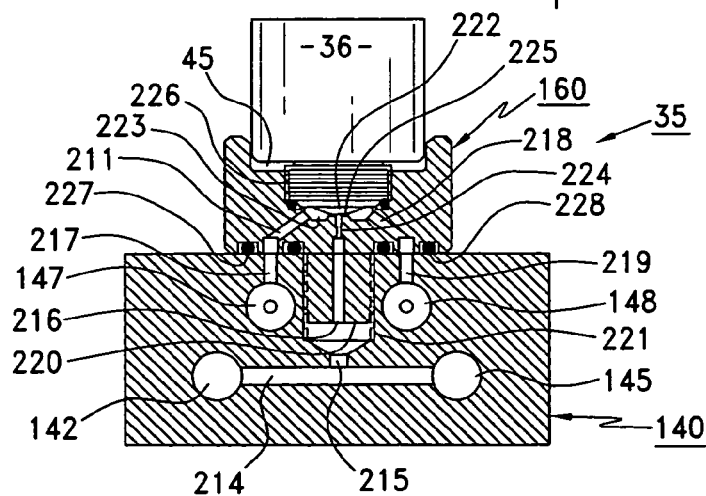

As may be seen best in FIGS. 5, 7 and 8, the solenoid 36 and its valve elements are mounted on a valve seat pedestal 160 that in turn is mounted on a remote manifold block 140 containing the passages and valves associated with the trim assembly. Passage 142 contains a check valve 144 and passage 145 contains a check valve 135 to prevent reverse flow through conduits 67 and 71 connecting them to head passages 78 and 80 that are in turn connected to trim chambers 139 and 146, respectively. Such reverse flow could otherwise occur while trim valve 35 is open. Check valves 135 and 144 are both installed in the manifold block 140 within corresponding bores 145 and 142 that are connected by the fittings 201 and 200 to conduits 71 and 67. The bore for valve 144 is intersected by a trim fluid passage 168 leading to a bore 147 containing a check valve 149, and the bore for valve 135 is intersected by trim fluid passage 169 leading to a bore 148 containing a check valve 150. The outer ends of the bores containing valves 149 and 150 are closed off by plugs 148 and 151, respectively, since the required flow paths are provided by passage 168 being connected to conduit 67 through the same port fitting 200 as valve 144, and passage 169 being connected to conduit 71 through the same port fitting 201 as valve 135.

The chambers 139 and 146 are arranged to receive hydraulic fluid when the other of these chambers is discharging fluid via an open trim valve 35. For this purpose, the passage 147 provides a flow path into trim chamber 139 via conduit 67, fitting 73, and head passage 78; and the passage 148 provides a flow path into trim chamber 146 via conduit 71, fitting 75, head passage 80, arcuate passage 85 and head port 87. Arcuate passage 85 is formed by the radial spacing between the housing cylinder 49 and the trim cylinder 32. Passage 147 contains a check valve 149, and passage 148 contains a check valve 150 to prevent reverse flow through these passages out of trim chambers 139 and 146, respectively.

Referring now to FIGS. 7 and 8, downstream of check valves 144 and 135, the passages 142 and 145 in block 140 are connected by a cross passage 214 and a vertical passage 215 to a vertical passage 216 in pedestal 160 that leads to an inlet passage 224 passing through a trim valve seat 225 and into a trim valve chamber 223. Outlet passages 211 and 218 in pedestal 160 feed passages 147 and 148 via respective vertical passages 217 and 219 in manifold block 140. A depending column 220 of pedestal 160 is threaded into a corresponding bore 221 in block 140, and interconnected passages 211,217 and 218,219 are sealed by O-rings 227 and 228, respectively.

Piston 116 is fixed to the inner end of trim rod 31 by threads 88 and a transverse pin 89 that passes through aligned holes in rod 31 and piston 116 as shown in FIG. 6. An elongated stabilizing member 83, which is fixed within a bore 84 in piston 116 and reciprocates within a bore 86 in intermediate head 34, prevents rotation of the head 34 and the entire housing 49 relative to trim rod 31. The member 83 may be a cylindrical pin or a bar having other cross-sectional shapes, and may instead be fixed to the head and reciprocate within a bore in the piston.

The fluid flow passages, valves and ports of the trimming unit 30 and the centering unit 28 will now be described with reference to FIGS. 5–8. Fluid may be supplied to or discharged from trim chambers 139 and 146 only when the trim valve member 222 is opened by the trim solenoid 36, such fluid being supplied to one trim chamber only while being discharged simultaneously from the other trim chamber. As shown in FIG. 5, the remote solenoid 36 for actuating trim valve assembly 35 receives electrical power from the trim switch 37 via an electrical line 193. The electrical circuitry of the solenoid 36 is grounded through the pedestal 160, the valve block 140 and a ground fitting represented by the grounded symbol 96 in FIG. 7.

As previously indicated, accumulator liquid pressure chamber 70 is in fluid communication with the passage 59 in intermediate head 34 via the conduit 58 that is connected to the head 34 by the fitting 63, which has a nipple threaded into a head port 179. Passage 59 is in direct fluid communication with centering chamber 48 via head port 179, and chamber 48 is in fluid communication with centering chamber 46 via inner port 56, arcuate housing passage 53 and outer port 54. As described above, arcuate passage 53 has three segments 53A, 53B and 53C defined by the casing 49 on the one hand and on the other hand by cylinder 51, stop ring 52 and cylinder 50, respectively. Optionally, the port 179 may lead directly into either chamber 48 or chamber 46, or into chamber 46 through its end head 100.

When valve member 222 is lifted away from inlet 224 of solenoid valve chamber 223 for allowing trim piston 116 to move inward relative to the housing 49, fluid is discharged from trim chamber 139 to valve chamber 223 via head passage 78, conduit 67, block passage 142, check valve 144, and inlet passages 214, 215 and 224. Simultaneously, fluid flows from valve chamber 223 into trim chamber 146 via outlet passages 218, 219 and 148, check valve 150, passage 169 connected to an outer portion of the bore containing valve 135, conduit 71, head passage 80, arcuate passage 85 and port 87.

When valve member 222 is lifted away from outlet 224 of solenoid valve chamber 223 for allowing trim piston 116 to move outward relative to the housing 49, fluid is discharged from trim chamber 146 to valve chamber 223 via port 87, arcuate passage 85, head passage 80, conduit 71, block passage 145, check valve 135, and inlet passages 214, 215 and 224. Simultaneously, fluid flows from valve chamber 223 into trim chamber 139 via outlet passages 216, 217 and 147, check valve 149, passage 168 connected to an outer portion of the bore containing valve 144, conduit 67, and head passage 78.

Valve chamber 223 is also connected to the trim reservoir chamber 198 via passages 216, 217, 147 and an interconnecting valve block passage 230 in order to absorb differences in the volume of trim fluid discharged from chamber 139 relative to the smaller volume of trim fluid discharged from chamber 146 due to the latter containing a portion of trim rod 31. The gas pocket above liquid surface F2 in trim reservoir 196 will be at the same pressure as the gas chamber 66 in accumulator 62 because the trim reservoir chamber 198 is in fluid communication with liquid pressure chamber 70 via a block passage 231 and a conduit 61.

The air chamber 66 of accumulator 62 may be pressurized by air to a pressure of, for example, 130 psig to provide the same pressure in each of the centering chambers 46 and 48. If the working area of each of the pistons 42 and 44 is 3.5 square inches, an accumulator pressure of 130 psig will provide a linear resistance force of about 400 pounds as measured at the tie rod 17 for opposing off-center movement of rod head 40. Since many conventional steering system geometries provide a linear resistance force of about 15 to 20 pounds as measured at the tie rod, the present invention may be used to increase the resistance and re-centering forces of these steering systems by a multiple of about 10 to about 30 or more, preferably about 15 to about 25. A resistance force of 400 pounds or more is particularly effective in eliminating the adverse effects of crosswinds on large vehicles.

The fitting 63 may optionally contain a flow restriction orifice. For a steer wheel control system having the foregoing characteristics, the flow restriction orifice may be sized at a diameter of about one-eighth inch. This passage size should not significantly affect off-center and return to center movements of the rod head 40 during normal steering and turning maneuvers in response to movements of the vehicle steering wheel. However, excessively rapid movement of the tie rod, such as may be caused by blowout of a steer wheel tire, is viscously dampened by the flow resistance of such an orifice so that the course of the vehicle may be safely controlled with relatively little additional steering effort by the driver. To illustrate this viscous dampening effect, it has been determined that initiation of an excessively rapid tie rod movement, as might be experienced during a tire blowout, can increase the pressure in the centering chambers from 100 psig to 200 psig, the latter applying a linear force of about 700 pounds to the tie rod.

The remotely controlled trim valve assembly 35 operates as follows. If there is a roadway pull to the right, straight ahead travel will require a compensating steering force to the left from the steering wheel to move the centering piston 44 slightly to the right away from stop 52 as illustrated in FIG. 6. Such movement of piston 44 in its chamber 48 causes piston 42 acting against stop 52 to produce a differential pressure across trim piston 116 in trim cylinder 32. While holding the steering wheel in the position giving straight ahead travel, the trim button 29 is pushed momentarily to briefly actuate solenoid 36 and open trim valve 35, which allows fluid to be discharged from trim chamber 139 and supplied to trim chamber 146 such that cylinder housing 49 moves to the right and the differential pressure across trim piston 116 is removed by equalizing the pressures in trim chambers 139 and 146. Fluid flowing out of chamber 139 follows the return flow path toward conduit 58 as described above, and fluid supplied to trim chamber 146 follows the supply flow path via conduit 67 as described above.

The movement of trim piston 116 in trim cylinder 32 causes centering piston 44 to be reseated in its rest position against stop 52, centering piston 42 remaining in its seated position against stop 52 during this trimming operation. After its momentary actuation, the trim button 29 is then released to deactivate solenoid 36 and close trim valve 35, which is held in its normally closed position by a compression spring (not shown). Trim piston 116 is thereby locked in its changed position corresponding to a new on-center position in which stop 52 is realigned with rod head 40. This new on-center position of stop 52 will then maintain the vehicle steering system in a newly centered condition, which provides straight ahead travel of the vehicle that is free from the previously experienced roadway pull to the right and will be maintained even when the steering wheel is released.

In FIGS. 5–7, the trim piston 116 is shown approximately in its center position within the trim cylinder 32. The trim piston preferably can move about one-half inch to about one inch to either side of its center position, i.e., the total stroke of the trim piston 116 is preferably in the range of about one inch to about two inches. The hydraulic fluid in this short trim cylinder is trapped on opposite sides of the trim piston by the trim valve 35 when it is closed, creating a hydraulic lock that holds the centering stop 52 between the centering cylinders 50 and 51 in a selected on-center position. The average trim corrections may be on the order of a few one-thousandths of an inch. The tolerance for backlash (rebound) or drift in either direction of the trim piston in the trim cylinder is preferably held to no more than one-thousandth of an inch.

The particularly important trimming feature of the invention may be achieved through accumulator systems other than the hydraulic accumulator unit 62 described above. For example, other gas pressurized hydraulic accumulator systems are described in my prior U.S. Pat. No. 4,410,193, No. 4,418,931, No. 4,534,577, No. 5,536,028, No. 6,267,395, No. 6,422,582, No. 6,520,519 and No. 6,520,520, and these systems may be employed for storing and providing hydraulic fluid under pressure to both the centering and trim chambers. Therefore, the entire contents of these prior patents are expressly incorporated herein by reference. However, the accumulator system shown in the drawings and described above is preferably for the compactness of the composite centering and trim units as separate from the remote trim valve assembly. In addition, the higher centering unit pressures achievable with the liquid pump arrangement for pressurizing the gas chamber of the accumulator permit a significantly smaller composite assembly of the centering and trim units, which requires a significantly smaller space for the installation of this composite and its connection between the steering system and the vehicle frame.

The remote trimming features of the invention are useable not only with the centering unit disclosed herein, but also in combination with centering mechanisms of the prior art. Thus, the remotely operable trimming unit of the present invention can be combined with centering devices of known types to provide adjustment of the center position during vehicle operation. In addition, a number of other modifications to both the variable resistance components and the trimming components specifically described herein are possible without departing from the scope of the invention, as defined by the claims below.

What is claimed is:

1. An apparatus for holding at a center position at least one steerable member mounted on a frame means for movement to either side of the center position, said apparatus comprising linkage means of variable length extending between said steerable member and said frame means wherein the length of said linkage means defines the center position, accumulator means for holding a supply of fluid, and means for pressurizing the fluid held in said accumulator means to provide a pressurized fluid source, said linkage means comprising centering means for providing a resistance force resisting steering forces tending to move said steerable member to either side of the center position, and trim means for transmitting said steering forces to said centering means;

wherein said centering means comprises:
centering cylinder means and centering piston means cooperating with said centering cylinder means to form first and second centering chambers, said centering piston means being arranged for movement in a first direction for compressing fluid within said first centering chamber and for movement in a second direction for compressing fluid within said second centering chamber,
centering rod means arranged for movement with said centering piston means to either side of a neutral position corresponding to said center position,
and centering fluid means for providing fluid communication between said accumulator means and said centering chambers so that a pressurized centering fluid in each of said first and second centering chambers provides said resistance force by biasing said centering piston means toward said neutral position upon movement of said steerable member toward either side of said center position;

wherein said trim means comprises:
a trim piston and trim rod means arranged for movement with said trim piston and providing a portion of said linkage means,
trim cylinder means providing a portion of said linkage means and cooperating with said trim piston to form first and second trim chambers one on each side of said trim piston,
and trim fluid means for providing a flow of trim fluid between each of said trim chambers and trim valve means located remotely from said trim piston and trim cylinder means and from said centering piston means and centering cylinder means, said trim valve means comprising a trim valve assembly carried by manifold means and operable between a closed position for preventing said trim fluid flow so that said trim piston is held in a locked position in said trim cylinder and an open position for allowing said trim fluid flow so that said trim piston is free to move away from said locked position in response to said steering forces, and said trim piston movement causing trim fluid flow to one of said trim chambers and trim fluid flow from the other of said trim chambers to change the length of said linkage means and thereby provide trimming movement of said steerable member to another center position;

wherein said trim cylinder means comprises a trim cylinder and means for closing said trim cylinder, said closure means having first and second fluid ports;
and wherein said trim fluid means further comprises:
first trim passage means in said closure means for fluid communication between said first port and said first trim chamber, and second trim passage means in said closure means for fluid communication between said second port and said second trim chamber,
a first supply passage in said manifold means for communicating with said first port to supply trim fluid to said first trim chamber,
a second supply passage in said manifold means for communicating with said second port to supply trim fluid to said second trim chamber,
a first return passage in said manifold means for communicating with said first port to receive trim fluid discharged from said first trim chamber,
a second return passage in said manifold means for communicating with said second port to receive trim fluid discharged from said second trim chamber,
a first supply valve for preventing reverse fluid flow in said first supply passage,
a second supply valve for preventing reverse fluid flow in said second supply passage,
a first return valve for preventing reverse fluid flow in said first return passage,
and a second return valve for preventing reverse fluid flow in said second return passage.

2. An apparatus according to claim 1, wherein said centering fluid means comprises centering passage means connecting a third port in said closure means to said first and second centering chambers, and centering conduit means connecting said third port to the pressurized fluid source of said accumulator means.

3. An apparatus according to claim 2, wherein said fluid is a liquid, and wherein said accumulator means comprises a liquid reservoir connected to a liquid pressure chamber of a pressurizable container means via pump means for pressurizing liquid received from said reservoir and supplying said pressurized liquid to said liquid pressure chamber, wherein said pressurizable container means further comprises a gas chamber and means for compressing a gas therein in response to pressurization of said liquid by said pump means, and wherein said centering conduit means connects said third port to said liquid pressure chamber.

4. An apparatus according to claim 3, wherein said centering fluid means further comprises centering valve means having one position for connecting said third port to said liquid pressure chamber and another position for disconnecting said third port from said liquid pressure chamber and simultaneously connecting said third port to said reservoir, said reservoir being at ambient pressure so that said centering chambers are depressurized when said centering valve means is in said another position.

5. An apparatus according to claim 4, for a vehicle having a power steering unit for providing steering power to said steerable member, wherein said centering fluid means further comprises actuating means activatable from a remote location for operating said centering valve means between said one and said another positions to prevent fluid pressure in said centering chambers in the absence of steering power from said power steering unit.

6. An apparatus according to claim 3, wherein said pressurizable container means further comprises means for charging a pressurized gas into said gas pressure chamber.

7. An apparatus according to claim 3, wherein said means for compressing a gas in said gas chamber comprises a cylinder portion of said pressurizable container and said cylinder portion contains a piston moveable in said cylinder portion to compress the gas in said gas chamber in response to said liquid pressure.

8. An apparatus according to claim 1, wherein said trim valve means further comprises trim reservoir means for receiving a flow of liquid trim fluid from an outlet chamber of said trim valve assembly when in its open position, and wherein said trim reservoir is connected to the pressurized fluid source of said accumulator means.

9. An apparatus according to claim 1, wherein said actuating means is mounted in a socket within said manifold means, said socket having an external opening providing external access to said actuating means and to said trim valve assembly for installation or service.

10. An apparatus according to claim 1, wherein said trim valve means comprises a valve member arranged for reciprocating movement between a closing position for causing simultaneously closure of said first and second return passages and an opening position for causing simultaneously opening of said first and second return passages.

11. An apparatus according to claim 1, wherein said fluid is a liquid, and wherein said centering fluid means includes means for restricting the rate of liquid flow from said centering chambers to said accumulator means in response to the rate of movement of said steerable member.

12. An apparatus according to claim 1, for a vehicle having a steering system comprising said at least one steerable member, wherein the fluid supplied by said accumulator means is a liquid and said liquid flows to and from said closure means via said centering fluid means; and wherein said pressurizing means comprises gas pressure means for applying pressure of a pressurized gas to said liquid in a liquid chamber of said accumulator means.

13. An apparatus according to claim 1, wherein said centering piston means comprises a first piston cooperating with said centering cylinder means to define said first centering chamber, and a second piston cooperating with said centering cylinder means to define said second centering chamber, each of said first and second pistons being arranged to move independently of the other between a retracted position and a position for compressing a fluid within its corresponding chamber;

wherein said centering rod means comprises a rod head arranged for movement to either side of said neutral position corresponding to said center position, and an elongated rod for causing said rod head to engage each of said centering pistons independently of the other so that movement of said rod head away from said neutral position to one side causes compressive movement of said first centering piston without moving said second centering piston and movement of said rod head away from said neutral position to the other side causes compressive movement of said second centering piston without moving said first centering piston; and, wherein said apparatus further comprises connecting means for connecting said elongated rod or said centering cylinder means to said steerable member for movement therewith.

14. An apparatus according to claim 13, wherein said fluid is a liquid and said accumulator means comprises a reservoir for holding a supply of said liquid, a liquid pressure chamber for receiving a flow of liquid from said reservoir, means for pressurizing the liquid in said liquid pressure chamber, and an outlet for providing fluid communication between said liquid pressure chamber and said centering fluid means; and, wherein said pressurizing means includes gas means for pressurizing a gas chamber with a gas, and means for using said gas pressure to pressurize the liquid in said liquid pressure chamber, said gas means comprising means for charging a predetermined amount of said gas to said gas chamber.

15. An apparatus according to claim 1 for a vehicle having a steering system comprising said at least one steerable member, wherein said actuating means comprises a solenoid fitted at least partially within a socket of a pedestal mounted on a manifold block of said manifold means, said solenoid being arranged to open and close said trim valve assembly, and wherein said trim fluid means further comprises activating means for remotely activating said solenoid from a location for driving said vehicle.

16. An apparatus according to claim 1, wherein an elongated stabilizing member is fixed to one of the intermediate head and the trim piston and reciprocates within a bore in the other of the intermediate head and the trim piston to prevent rotation of the intermediate head relative to the trim rod.

17. An apparatus according to claim 1, wherein said closure means comprises an intermediate head interconnecting said trim cylinder means and said centering cylinder means, wherein said first trim passage means comprises a first 2-way passage in said intermediate head, and wherein said second trim passage means comprises a second 2-way passage in said intermediate head.

18. An apparatus according to claim 17, wherein said centering fluid means comprises centering passage means connecting a third port in said intermediate head to said first and second centering chambers, and centering conduit means connecting said third port to the pressurized fluid source of said accumulator means.

19. An apparatus according to claim 17, wherein said trim fluid means further comprises actuating means activatable from a remote location for operating said trim valve assembly between said closed and open positions, said trim valve assembly and said actuating means being carried by said manifold means.

20. An apparatus for holding at a center position at least one steerable member mounted on a frame means for movement to either side of the center position, said apparatus comprising linkage means of variable length extending between said steerable member and said frame means wherein the length of said linkage means defines the center position, accumulator means for holding a supply of fluid, and means for pressurizing the fluid held in said accumulator means to provide a pressurized fluid source, said linkage means comprising centering means for providing a resistance force resisting steering forces tending to move said steerable member to either side of the center position, and trim means for transmitting said steering forces to said centering means;

wherein said centering means comprises:
centering cylinder means and centering piston means cooperating with said centering cylinder means to form first and second centering chambers, said centering piston means being arranged for movement in a first direction for compressing fluid within said first centering chamber and for movement in a second direction for compressing fluid within said second centering chamber,
centering rod means arranged for movement with said centering piston means to either side of a neutral position corresponding to said center position,
and centering fluid means for providing fluid communication between said accumulator means and said centering chambers so that a pressurized centering fluid in each of said first and second centering chambers provides said resistance force by biasing said centering piston means toward said neutral position upon movement of said steerable member toward either side of said center position;

wherein said trim means comprises:
a trim piston and trim rod means arranged for movement with said trim piston and providing a portion of said linkage means,
trim cylinder means providing a portion of said linkage means and cooperating with said trim piston to form first and second trim chambers one on each side of said trim piston,
and trim fluid means for providing a flow of trim fluid between said accumulator means and each of said trim chambers and comprising trim valve means operable between a closed position for preventing said trim fluid flow so that said trim piston is held in a locked position in said trim cylinder and an open position for allowing said trim fluid flow so that said trim piston is free to move away from said locked position in response to said steering forces, said trim piston movement causing trim fluid flow to one of said trim chambers and trim fluid flow from the other of said trim chambers to change the length of said linkage means and thereby provide trimming movement of said steerable member to another center position;
wherein said accumulator means comprises a liquid reservoir connected to a liquid pressure chamber of a pressurizable container means via pump means for pressurizing liquid received from said reservoir and supplying said pressurized liquid to said liquid pressure chamber,
wherein said pressurizable container means comprises a gas chamber and means for compressing a gas therein in response to pressurization of said liquid by said pump means,
wherein said centering cylinder means comprises a centering cylinder and means for closing said centering cylinder, said closure means having a centering liquid port,
wherein said centering fluid means comprises centering passage means connecting said centering liquid port to said first and second centering chambers, and centering conduit means connecting said centering liquid port to said liquid pressure chamber,
and wherein said centering fluid means further comprises centering valve means having one position for connecting said centering liquid port to said liquid pressure chamber and another position for disconnecting said centering liquid port from said liquid pressure chamber and simultaneously connecting said centering liquid port to said reservoir, said reservoir being at ambient pressure so that said centering chambers are depressurized when said centering valve means is in said another position.

21. An apparatus according to claim 20, for a vehicle having a power steering unit for providing steering power to said steerable member, wherein said centering fluid means further comprises actuating means activatable from a remote location for operating said centering valve means between said one and said another positions to prevent fluid pressure in said centering chambers in the absence of steering power from said power steering unit.

22. An apparatus according to claim 20, wherein said trim fluid means further comprises actuating means activatable from a remote location for operating said trim valve means between said closed and open positions.

23. An apparatus according to claim 20, wherein said trim cylinder means comprises a trim cylinder and means for closing said trim cylinder, said closure means having first and second fluid ports,
wherein said trim valve means comprises a trim valve assembly carried by manifold means,
and wherein said trim fluid means further comprises:
first trim passage means in said closure means for fluid communication between said first port and said first trim chamber, and second trim passage means in said closure means for fluid communication between said second port and said second trim chamber,
a first supply passage in said manifold means for communicating with said first port to supply trim fluid to said first trim chamber,
a second supply passage in said manifold means for communicating with said second port to supply trim fluid to said second trim chamber,
a first return passage in said manifold means for communicating with said first port to receive trim fluid discharged from said first trim chamber,
a second return passage in said manifold means for communicating with said second port to receive trim fluid discharged from said second trim chamber,
a first supply valve for preventing reverse fluid flow in said first supply passage,
a second supply valve for preventing reverse fluid flow in said second supply passage,
a first return valve for preventing reverse fluid flow in said first return passage,
and a second return valve for preventing reverse fluid flow in said second return passage.

24. An apparatus according to claim 23, wherein said closure means comprises an intermediate head interconnecting said trim cylinder means and said centering cylinder means, wherein said first trim passage means comprises a first 2-way passage in said intermediate head, and wherein said second trim passage means comprises a second 2-way passage in said intermediate head.

25. An apparatus according to claim 24, wherein said centering fluid means comprises centering passage means connecting a third port in said intermediate head to said first and second centering chambers, and centering conduit means connecting said third port to the pressurized fluid source of said accumulator means.

26. An apparatus according to claim 24, wherein an elongated stabilizing member is fixed to one of the intermediate head and the trim piston and reciprocates within a bore in the other of the intermediate head and the trim piston to prevent rotation of the intermediate head relative to the trim rod.

27. An apparatus according to claim 20, wherein said pressurizable container means further comprises means for charging a pressurized gas into said gas pressure chamber.

28. An apparatus according to claim 20, wherein said means for compressing a gas in said gas chamber comprises a cylinder portion of said pressurizable container and said cylinder portion contains a piston moveable in said cylinder portion to compress the gas in said gas chamber in response to said liquid pressure.

29. An apparatus according to claim 20, wherein said centering piston means comprises a first piston cooperating with said centering cylinder means to define said first centering chamber, and a second piston cooperating with said centering cylinder means to define said second centering chamber, each of said first and second pistons being arranged to move independently of the other between a retracted position and a position for compressing a fluid within its corresponding chamber;
wherein said centering rod means comprises a rod head arranged for movement to either side of said neutral position corresponding to said center position, and an elongated rod for causing said rod head to engage each of said centering pistons independently of the other so that movement of said rod head away from said neutral position to one side causes compressive movement of said first centering piston without moving said second centering piston and movement of said rod head away from said neutral position to the other side causes compressive movement of said second centering piston without moving said first centering piston; and, wherein said apparatus further comprises connecting means for connecting said elongated rod or said centering cylinder means to said steerable member for movement therewith.

* * * * *